US012629745B2

(12) United States Patent (10) Patent No.: US 12,629,745 B2
Aitoh et al. (45) Date of Patent: May 19, 2026

(54) FRAME MEMBER

(71) Applicant: NIPPON STEEL CORPORATION, Tokyo (JP)

(72) Inventors: Takahiro Aitoh, Tokyo (JP); Yuri Toda, Tokyo (JP); Ryo Tabata, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 237 days.

(21) Appl. No.: 18/289,198

(22) PCT Filed: Apr. 26, 2022

(86) PCT No.: PCT/JP2022/018963
§ 371 (c)(1),
(2) Date: May 28, 2024

(87) PCT Pub. No.: WO2022/234792
PCT Pub. Date: Nov. 10, 2022

(65) Prior Publication Data
US 2025/0339892 A1 Nov. 6, 2025

(30) Foreign Application Priority Data

May 6, 2021 (JP) ................................. 2021-078463

(51) Int. Cl.
*B21D 53/88* (2006.01)
*B21D 17/00* (2006.01)
(Continued)

(52) U.S. Cl.
CPC ............. *B21D 53/88* (2013.01); *B21D 17/00* (2013.01); *B62D 29/007* (2013.01); *B21D 22/022* (2013.01)

(58) Field of Classification Search
CPC ...... B21D 53/88; B62D 25/04; B62D 25/025; B62D 21/15
See application file for complete search history.

(56) References Cited

U.S. PATENT DOCUMENTS 9,205,870 B2 * 12/2015 Kuwayama ............ B62D 21/02
2019/0283805 A1 * 9/2019 Kurokawa ............. B62D 21/02
(Continued)

FOREIGN PATENT DOCUMENTS

JP 5-195149 A 8/1993
JP 2009-286351 A 12/2009
(Continued)

*Primary Examiner* — Michael W Hotchkiss
(74) *Attorney, Agent, or Firm* — Birch, Stewart, Kolasch & Birch, LLP

(57) ABSTRACT

Provided is a frame member formed by hot-stamping a steel sheet. The frame member has a closed cross section portion in which a cross section perpendicular to a longitudinal direction is a closed cross section, and the closed cross section portion has at least two flat parts having a radius of curvature larger than a maximum external dimension of the cross section, and a recessed bead part formed between the two flat parts. The recessed bead part has a pair of wall portions which have a radius of curvature of 50 mm or greater, and protrude toward an inside of the closed cross section portion from end portions of the two flat parts facing each other via a pair of bent portions bent toward an inside of the closed cross section. A Vickers hardness of a thickness middle portion in the wall portion is 520 Hv or greater, a width of the wall portion is 0.5 times or greater and 2.5 times or less an effective width $W_e$, and a standard deviation ratio obtained by dividing a standard deviation of hardness frequency distribution in a surface layer portion in the wall portion by a standard deviation of hardness frequency distribution in the thickness middle portion in the wall portion is less than 1.0.

10 Claims, 7 Drawing Sheets

(51) Int. Cl.
  B21D 22/02 (2006.01)
  B62D 29/00 (2006.01)

(56) References Cited

U.S. PATENT DOCUMENTS

| | | | | |
|---|---|---|---|---|
| 2020/0010919 A1* | 1/2020 | Suzuki | ................... | C22C 38/08 |
| 2021/0031835 A1* | 2/2021 | Tsunemi | ............. | B62D 29/043 |
| 2022/0001929 A1* | 1/2022 | Kubota | .................. | B62D 25/20 |
| 2022/0081033 A1* | 3/2022 | Higai | .................... | B62D 25/08 |
| 2022/0177034 A1* | 6/2022 | Sakaidani | ............. | B62D 21/15 |

FOREIGN PATENT DOCUMENTS

| | | | |
|---|---|---|---|
| JP | 2020-153401 A | 9/2020 | |
| WO | WO 2018/151322 A1 | 8/2018 | |
| WO | WO 2020/100886 A1 | 5/2020 | |

* cited by examiner

FIG. 8
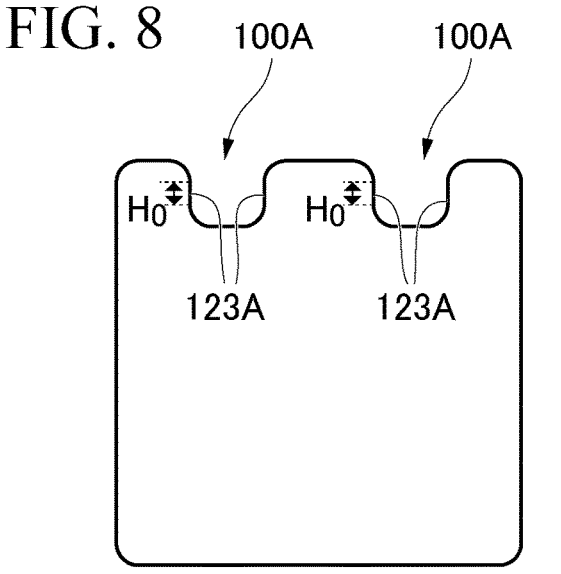
1A
FIG. 9
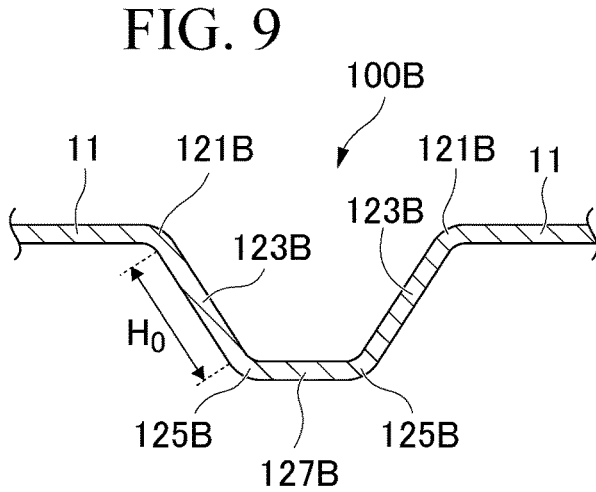
FIG. 10
100C
121C 121C
11    11
123C
123C
$H_0$
125C

FRAME MEMBER

TECHNICAL FIELD OF THE INVENTION

The present invention relates to a frame member having excellent energy absorption efficiency.

Priority is claimed on Japanese Patent Application No. 2021-078463, filed on May 6, 2021, the content of which is incorporated herein by reference.

RELATED ART

In the related art, a hollow member obtained by processing a steel sheet into a predetermined closed cross-sectional shape has been used as a frame member of a vehicle. Such a frame member is required to realize the weight reduction and to exhibit a sufficient proof stress and energy absorption performance in a case where a bending load is applied thereto due to a collision.

Examples of the method primarily used for realizing the weight reduction include a method of reducing the weight by thinning a member by an increase in the proof stress and energy absorption performance due to an increase of the strength of a steel sheet. Therefore, in recent years, a steel sheet capable of exhibiting a tensile strength greater than 1.8 GPa may be used as a material of a frame member.

Patent Document 1 discloses a collision-proof reinforcing member for a vehicle which is formed of a formed thin sheet to increase buckling resistance, including at least a main body portion and a pair of side wall portions integrated with the main body portion via folding portions, in which the main body portion is provided with a recessed bead extending in a center of the main body portion in a width direction along a longitudinal direction of the main body portion, and the recessed bead is provided so that an effective width c' as a distance between the recessed bead and the folding portion satisfies a specific range.

PRIOR ART DOCUMENT

Patent Document

[Patent Document 1] Japanese Unexamined Patent Application, First Publication No. 2009-286351

DISCLOSURE OF THE INVENTION

Problems to be Solved by the Invention

According to the technology of Patent Document 1, the bead is provided in consideration of the effective width, and thus it is possible to suppress elastic buckling and to improve the proof stress. However, in order to reduce the weight by further thinning, it is required to take measures for further increasing the energy absorption efficiency which is the amount of energy absorbed per unit cross-section area of the frame member.

The present invention has been made in view of the above problems, and an object of the present invention is to provide a frame member having excellent energy absorption efficiency.

Means for Solving the Problem

Specific aspects of the present invention are as described below.

(1) A first aspect of the present invention is a frame member formed by hot-stamping a steel sheet, in which the frame member has a closed cross section portion in which a cross section perpendicular to a longitudinal direction is a closed cross section, the closed cross section portion has at least two flat parts having a radius of curvature larger than a maximum external dimension of the cross section, and a recessed bead part formed between the two flat parts, the recessed bead part has a pair of wall portions which have a radius of curvature of 50 mm or greater, and protrude toward an inside of the closed cross section portion from end portions of the two flat parts facing each other via a pair of bent portions bent toward an inside of the closed cross section, a Vickers hardness of a thickness middle portion in the wall portion is 520 Hv or greater, a width of the wall portion is 0.5 times or greater and 2.5 times or less an effective width $W_e$ obtained from Karman's effective width formula, and a standard deviation ratio obtained by dividing a standard deviation of hardness frequency distribution in a surface layer portion in the wall portion by a standard deviation of hardness frequency distribution in the thickness middle portion in the wall portion is less than 1.0.

(2) In the frame member according to (1), the closed cross section portion may be present in 50% or greater of a whole length of the frame member in the longitudinal direction.

(3) In the frame member according to (1) or (2), the closed cross section portion may be configured by joining a plurality of members together.

(4) In the frame member according to any one of (1) to (3), a sheet thickness of the recessed bead part may be 1.2 mm or less.

(5) In the frame member according to any one of (1) to (4), two or more recessed bead parts may be provided.

(6) In the frame member according to any one of (1) to (5), the standard deviation ratio may be less than 0.8.

Effects of the Invention

According to the above aspect, in a case where the width of the wall portion of the recessed bead part and the hardness standard deviation ratio are controlled within appropriate ranges, it is possible to prevent bending fracture while suppressing elastic buckling. Accordingly, a high degree of energy absorption performance can be obtained even in a case where a high-strength thin member is used. Accordingly, it is possible to exhibit excellent energy absorption efficiency.

BRIEF DESCRIPTION OF THE DRAWINGS

FIG. 8 is a cross-sectional view showing a modification example of the frame member.

FIG. 9 is a schematic view showing a modification example of a recessed bead part.

FIG. 10 is a schematic view showing another modification example of the recessed bead part.

EMBODIMENTS OF THE INVENTION

Figure 1:
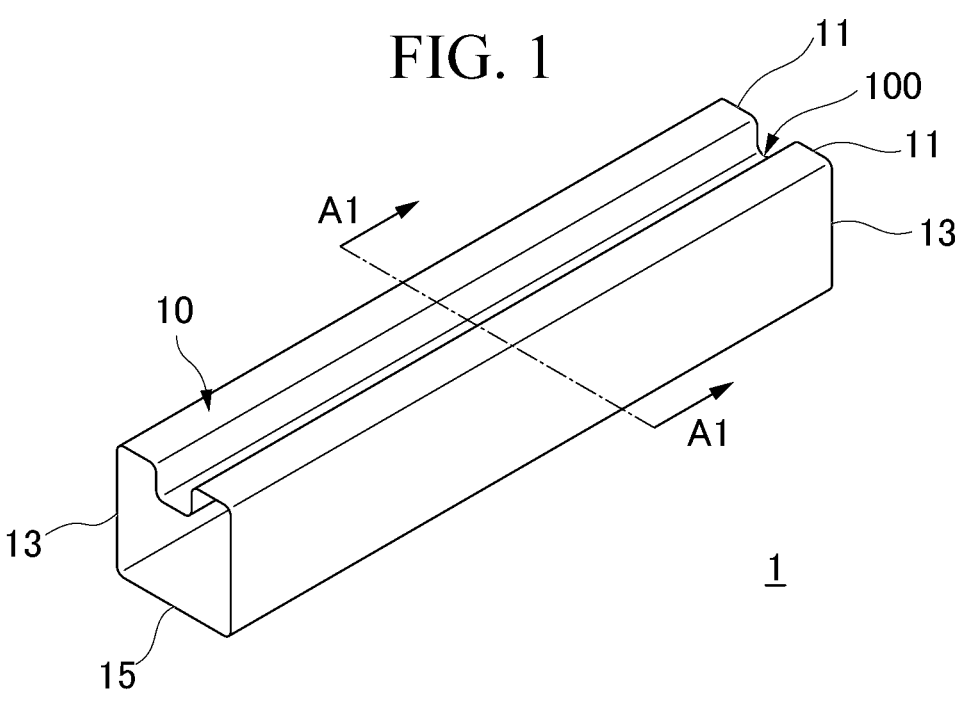
FIG. 1 is a perspective view showing a frame member according to one embodiment of the present invention.

The present inventors intensively studied the configuration of a frame member capable of exhibiting excellent energy absorption efficiency.

First, in order to exhibit excellent energy absorption efficiency, it is important that the frame member has a bending proof stress of a certain level or higher. By forming a bead along a longitudinal direction of the member, it is possible to improve the bending proof stress in a case where an input load in a bending direction is applied due to a collision. However, in a case where elastic buckling (deflection) occurs in a bead side surface in the initial stage of deformation, a required bending proof stress may not be obtained, and excellent energy absorption efficiency may not be exhibited.

In addition, in order to exhibit excellent energy absorption efficiency, it is also important that the frame member realizes deformation in a desired deformation mode immediately after a bending load is applied thereto due to a collision, in order to efficiently absorb impact energy. In particular, in a case where fracture occurs in a bent portion after the start of deformation, excellent energy absorption efficiency may not be exhibited.

Accordingly, it can be said that in a case where a cross section where elastic buckling hardly occurs in a surface with a bead formed thereon is designed and high bending performance can be imparted so that fracture hardly occurs, excellent energy absorption efficiency can be exhibited.

Here, in a case where the member is increased in strength and thinned as a method for realizing the weight reduction, the following problems occur.

Due to the thinning, elastic buckling is likely to occur, whereby it becomes difficult to obtain a necessary proof stress.

Due to the increase of the strength, the bending performance of the steel sheet is reduced, and fracture is likely to occur in a bent portion after the start of deformation. Therefore, it becomes difficult to efficiently absorb impact energy.

The present inventors paid attention to the fact that the above-described problems hinder a further increase of the strength and thinning of a high strength steel sheet.

The present inventors further conducted studies, and found that in a case where the width of a wall portion of a recessed bead and the hardness standard deviation ratio are controlled within appropriate ranges, it is possible to prevent bending fracture while suppressing elastic buckling. The present inventors found that thanks to such control, it is possible to solve the above-described problems which may occur in using a high strength steel sheet, and to exhibit excellent energy absorption efficiency, and completed the present invention.

First Embodiment

Hereinafter, a frame member 1 according to a first embodiment of the present invention will be described.

First, terms and phrases in the present specification will be described.

The "longitudinal direction" means a member axis direction of a frame member, that is, a direction in which the axis extends.

The "bending compressive assuming surface" means a part in the frame member, where it is assumed that a compressive stress in the longitudinal direction is generated in a case where the frame member receives a bending load due to a collision or the like.

The "flat part" means a linear part in a cross section perpendicular to the longitudinal direction of the frame member, specifically, a part having a radius of curvature larger than a maximum external dimension of the cross section. The maximum external dimension means the maximum straight line length between end portions at two arbitrary points in the cross section. Among parts constituting a recessed bead part, a linear part is not regarded as a flat part.

The "recessed bead part" means a part protruding from the bending compressive assuming surface toward the inside of a closed cross section portion in a cross section perpendicular to the longitudinal direction of the frame member.

The "corner part" means a non-linear part excluding the flat part and the recessed bead part in the cross section perpendicular to the longitudinal direction of the frame member.

The "width" means a line length along the circumferential direction of the closed cross section portion, and for example, the "width of the wall portion" means a line length between one end and the other end of the wall portion.

The "effective width" is an effective width $W_e$ obtained from Formula (1) based on Karman's effective width theory, that is, Karman's effective width formula.

$$W_\varepsilon = t \sqrt{\frac{4\pi^2 \varepsilon}{12(1 - v^2)\sigma_y}} \qquad \text{Formula (1)}$$

Here, the meanings of the symbols are as follows.

$\sigma_y$: Yield stress (MPa) of wall portion

E: Young's modulus (MPa) of wall portion t: Sheet thickness (mm) of wall portion v: Poisson's ratio of wall portion In addition, in the steel sheet, as the Young's modulus of the wall portion and the Poisson's ratio of the wall portion, general physical property values may be used, and by replacing the yield stress of the wall portion with the Vickers hardness of the thickness middle portion, the effective width $W_e$ can be obtained from Expression $W_e = 577\ t/\sqrt{h}$.

Here, the meanings of the symbols are as follows.

t: Sheet thickness (mm) of wall portion h: Vickers hardness (Hv) of thickness middle portion of wall portion In a case where it is difficult to obtain the effective width $W_e$ from Formula (1), the effective width $W_e$ can be obtained from the above expression.

The "effective width ratio" is a ratio of a width $H_0$ of the wall portion of the recessed bead part to the effective width $W_e$, and is a value calculated by $H_0/W_e$. It can be said that the smaller the value of the effective width ratio, the more hardly the elastic buckling in the wall portion occurs in the cross-sectional shape.

The "surface layer portion" means a region between: a depth position where a distance from a surface of the steel sheet to the depth position separated therefrom in the sheet thickness direction is 1% of the sheet thickness of the steel sheet; and a depth position where a distance from the surface of the steel sheet to the depth position separated therefrom in the sheet thickness direction is 5% of the sheet thickness of the steel sheet.

The "thickness middle portion" means a depth position where a distance from the surface of the steel sheet to the depth position separated therefrom in the sheet thickness direction of the steel sheet is 3/8 of the sheet thickness.

The "surface of the steel sheet" set as the reference of the depth position means a surface of a base steel sheet. For example, in a case where the steel sheet is plated or painted, or rust or the like is formed thereon, the surface of the steel sheet in a state where the plating, painting, and rust have been removed is set as the reference of the depth position. In a case where a surface layer coating such as plating, painting, rust, or the like is formed on the surface of the base steel sheet, the boundary between the surface layer coating and the surface of the base steel sheet is easily identified by various known methods.

The "amount of energy absorbed" is an amount of energy absorbed calculated from the relationship between the impactor reaction force (load) and the stroke when a rigid flat impactor is allowed to collide with the bending compressive assuming surface in a state in which both ends of the frame member are completely restricted.

The "energy absorption efficiency" is an amount of energy absorbed per cross-section area of the frame member. In a case where the frame member does not have a uniform cross section in the longitudinal direction, the energy absorption efficiency is an amount of energy absorbed per cross-section area in a closed cross section where the cross-section area is minimum in a closed cross section perpendicular to the longitudinal direction of the member.

Figure 2:
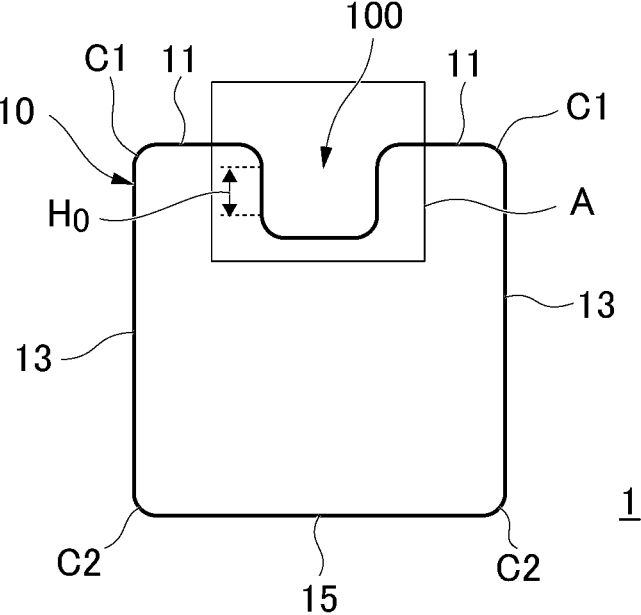
FIG. 2 is a cross-sectional view along the cutting-plane line A1-A1 of FIG. 1.
Figure 3:
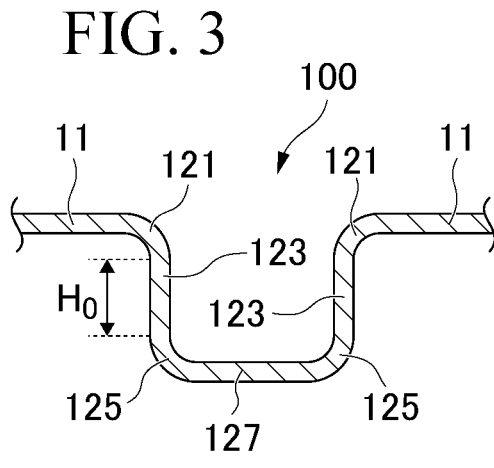
FIG. 3 is an enlarged view of a region surrounded by A of FIG. 2.

FIG. 1 is a perspective view of the frame member 1. FIG. 2 is a cross-sectional view along the cutting-plane line A1-A1 of FIG. 1, and is a cross-sectional view perpendicular to the longitudinal direction of the frame member 1. FIG. 3 is an enlarged view of a region surrounded by A of FIG. 2.

As shown in FIGS. 1 and 2, the frame member 1 is formed of a main body 10 having a hollow tube shape extending in the longitudinal direction. That is, the frame member 1 is a member in which a cross section perpendicular to the longitudinal direction is a closed cross section as a single unit.

In the frame member 1, the bending compressive assuming surface is disposed to face the outside of a vehicle body, whereby in a case where a collision is applied, a load capacity is exhibited against the compressive stress in the bending compressive assuming surface.

The bending compressive assuming surface is provided with a recessed bead part 100 interposed between two first flat parts 11, 11.

For example, in a case where the bending compressive assuming surface is formed only of flat parts, the load capacity may not be fully exhibited due to the deflection of the flat part in a case where a compressive load is applied. However, in a case where the recessed bead part 100 is disposed to be interposed between the two first flat parts 11, 11 as in the frame member 1, the load capacity improvement effect can be obtained.

First corner parts C1, C1 are formed at outer end portions of the first flat parts 11, 11. Two second flat parts 13, 13 whose surfaces face each other extend from end portions of the first corner parts C1, C1 on the sides opposite to the first flat parts 11, 11.

Furthermore, second corner parts C2, C2 bent in directions approaching each other are formed at end portions of the second flat parts 13, 13 on the sides opposite to the first corner parts C1, C1. End portions of the second corner parts C2, C2 on the sides opposite to the second flat parts 13 are connected to each other by a third flat part 15.

Accordingly, in the frame member 1 according to the present embodiment, the recessed bead part 100, the first flat parts 11, 11, the second flat parts 13, 13, the third flat part 15, the first corner parts C1, C1, and the second corner parts C2, C2 form a closed cross section portion.

As shown in FIG. 3, in the cross section of the frame member 1 perpendicular to the longitudinal direction, the recessed bead part 100 includes first bent portions 121, 121, wall portions 123, 123, second bent portions 125, 125, and a bottom portion 127.

The first bent portions 121, 121 are parts which are bent toward the inside of the closed cross section from end portions of the two first flat parts 11, 11 facing each other. Since a part having a radius of curvature of 50 mm or greater is regarded as a part of the wall portion, the radius of curvature of the first bent portion 121 is less than 50 mm. The radius of curvature of the first bent portion 121 may be, for example, 3 mm to 5 mm.

The wall portions 123, 123 are parts protruding toward the inside of the closed cross section portion via the first bent portions 121 and 121. The wall portions 123, 123 are linear parts having a radius of curvature of 50 mm or greater.

The second bent portions 125, 125 are parts which are bent in directions facing each other from end portions of the wall portions 123, 123 on the sides opposite to the first bent portions 121, 121. Since a part having a radius of curvature of 50 mm or greater is regarded as a part of the wall portion 123 or a part of the bottom portion 127, the radius of curvature of the second bent portion 125 is less than 50 mm. The radius of curvature of the second bent portion 125 may be, for example, 3 mm to 5 mm.

The bottom portion 127 is a part linearly connecting end portions of the second bent portions 125, 125 on the sides opposite to the wall portions 123, 123 to each other.

In a case where a width $H_0$ of the wall portion 123 of the recessed bead part 100 is too large, elastic buckling is likely to occur in the initial stage of deformation when the frame member 1 receives a bending load, whereby a necessary proof stress cannot be obtained. Therefore, it becomes difficult for the frame member 1 to exhibit excellent energy absorption efficiency. Accordingly, the width $H_0$ of the wall portion 123 is set to be 2.5 times or less the effective width $W_e$.

Meanwhile, in a case where the width $H_0$ of the wall portion 123 is too small, the bending proof stress improvement effect due to the recessed bead provided is reduced. Accordingly, the width $H_0$ is set to be 0.5 times or greater the effective width $W_e$.

The upper limit of the effective width $W_e$ is preferably 60 mm or less in order to obtain a required proof stress.

The sheet thickness of the recessed bead part 100 is preferably 1.2 mm or less from the viewpoint of weight reduction.

Meanwhile, in a case where the sheet thickness of the recessed bead part 100 is less than 0.4 mm, elastic buckling is likely to occur in the wall portion 123 of the recessed bead part 100, and thus the setting range of the width $H_0$ is greatly restricted. Accordingly, the sheet thickness of the recessed bead part 100 is preferably 0.4 mm or greater.

The frame member 1 is formed by: heating a steel sheet for hot stamping up to an austenite range: forming, in a state in which the steel sheet is held in a predetermined temperature range, the steel sheet into a predetermined shape through hot stamping for performing pressing while performing a quenching treatment by a press die and punch having a rapid cooling mechanism; and then joining end surfaces together. The frame member 1 formed as described above has a strength greater than 1.8 GPa in terms of tensile strength. In addition, since the frame member is formed as described above, the Vickers hardness of the thickness middle portion of the wall portion 123 of the recessed bead part 100 in the frame member 1 is 520 Hv or greater in a hardness test performed by the method described in JIS Z 2244:2009 with a test load of 300 gf (2.9 N).

In the present application, since excellent energy absorption efficiency is exhibited by increasing the deformability on the premise of an increase of the strength, the hardness of the thickness middle portion in the wall portion 123 of the recessed bead part 100 is set to 520 Hv or greater in terms of Vickers hardness.

The upper limit of the hardness of the thickness middle portion is not particularly specified, but may be 850 Hv or less in terms of Vickers hardness.

A method of measuring the hardness of the thickness middle portion in the wall portion 123 of the recessed bead part 100 is as follows.

A sample having a cross section perpendicular to the sheet surface is collected from the wall portion 123 of the recessed bead part 100. The cross section is prepared as a measurement surface, and the measurement surface is subjected to a hardness test.

The size of the measurement surface depends on the measuring apparatus, but may be about 10 mm×10 mm.

The method of preparing the measurement surface is performed according to JIS Z 2244:2009.

After the measurement surface is polished using silicon carbide paper ranging from #600 to #1500, the measurement surface is mirror-finished using a liquid obtained by dispersing a diamond powder having a particle size of 1 μm to 6 μm in a dilution liquid such as alcohol or pure water.

The measurement surface mirror-finished as described above is subjected to the hardness test by the method described in JIS Z 2244:2009.

Hardness is measured using a micro-Vickers hardness tester at 30 points that are arranged at intervals of three times or more the indentation under a load of 300 gf in the position at a depth of ⅜ of the sheet thickness of the sample, and the average value of the measured values is defined as the hardness of the thickness middle portion.

As described above, in a case where the width $H_0$ of the wall portion 123 is 2.5 times or less the effective width $W_e$, elastic buckling can be suppressed in the wall portion 123.

However, in a high-strength material, e.g., a hot-stamped material having a strength greater than 1.8 GPa, in a case where the bending performance is insufficient, fracture occurs during deformation due to a bending load even in a case where elastic buckling can be suppressed by controlling the effective width $W_e$, whereby excellent energy absorption efficiency cannot be obtained.

However, in the frame member 1 according to the present embodiment, the bending performance is increased by appropriately controlling the ratio between the standard deviation of hardness frequency distribution in the thickness middle portion and the standard deviation of hardness frequency distribution in the surface layer portion in the wall portion 123 of the recessed bead part 100.

Accordingly, in the frame member 1 according to the present embodiment, even in a case where a high-strength material is applied, fracture during deformation is suppressed, and it is possible to exhibit significantly excellent energy absorption efficiency compared to the related art.

Specifically, in the frame member 1 according to the present embodiment, in the wall portion 123 of the recessed bead part 100, the hardness standard deviation ratio which is a value obtained by dividing the standard deviation of hardness frequency distribution in the surface layer portion by the standard deviation of hardness frequency distribution in the thickness middle portion (depth position of ⅜ of the sheet thickness) is controlled to be less than 1.0.

The present inventors have found through experiments that in a case where the hardness standard deviation ratio is less than 1.0 in applying a hot-stamped material having a strength greater than 1.8 GPa, the maximum bending angle in a VDA bending test based on the VDA standard (VDA238-100) specified by the German Association of the Automotive Industry can be considerably improved.

Figure 4:
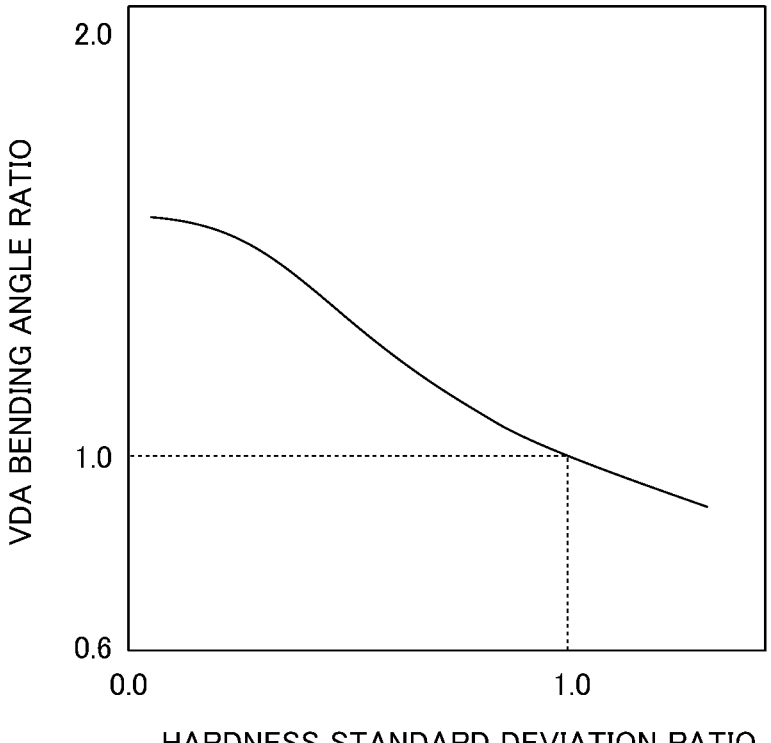
FIG. 4 is a graph showing a relationship between a hardness standard deviation ratio and a bending angle ratio in a VDA bending test with respect to a 2.0 GPa-grade material.

FIG. 4 is a graph showing the results of the VDA bending test using a steel sheet of a 2.0 GPa-grade material with a thickness of 1.4 mm. It is found that the less the hardness standard deviation ratio is than 1.0, the larger the maximum bending angle) (°) in the VDA bending test and the higher the bending angle ratio. That is, in a case where the hardness standard deviation ratio is less than 1.0, fracture hardly occurs during deformation due to a load in an axial direction, and excellent energy absorption efficiency can be exhibited. The standard deviation ratio is more preferably less than 0.8.

Here, the hardness frequency distribution in the thickness middle portion and the hardness frequency distribution in the surface layer portion are acquired by a Vickers hardness test.

First, a sample having a cross section perpendicular to the sheet surface is cut out from an optional position including the wall portion 123 of the recessed bead part 100. The cross section is prepared as a measurement surface, and the measurement surface is subjected to a hardness test.

The size of the measurement surface depends on the measuring apparatus, but may be about 10 mm×10 mm.

The method of preparing the measurement surface is performed according to JIS Z 2244:2009.

After the measurement surface is polished using silicon carbide paper ranging from #600 to #1500, the measurement surface is mirror-finished using a liquid obtained by dispersing a diamond powder having a particle size of 1 μm to 6 μm in a dilution liquid such as alcohol or pure water.

The measurement surface mirror-finished as described above is subjected to the hardness test by the method described in JIS Z 2244:2009.

The hardness in the surface layer portion is measured using a micro-Vickers hardness tester.

Hardness is measured at 30 points that are arranged at intervals of three times or more the indentation under a load of 300 gf, and the hardness frequency distribution in the surface layer portion is obtained.

Similarly, in the thickness middle portion (depth position of $3/8$ of the sheet thickness), hardness is measured at 30 points that are arranged at intervals of three times or more the indentation under a load of 300 gf, and the hardness frequency distribution in the thickness middle portion is obtained.

A known statistical method is used to obtain the standard deviations of the hardness frequency distribution in the surface layer portion and the hardness frequency distribution in the thickness middle portion, obtained as a result of the Vickers hardness test described above.

In a case where the metallographic structure is the same in a thickness middle portion and a surface layer portion of a steel sheet for hot stamping as in the related art, the hardness frequency distribution in the surface layer portion is the same as the hardness frequency distribution in the thickness middle portion, and the hardness standard deviation ratio is 1.0.

Meanwhile, in a case where the metallographic structure in only the surface layer portion and the vicinity thereof is modified, the hardness standard deviation ratio becomes a value different from 1.0.

In the frame member 1 formed of a steel sheet for hot stamping according to the present embodiment, in a case where the metallographic structure in only the surface layer portion and the vicinity thereof is modified, the distribution and unevenness of the hardness in the surface layer portion are suppressed, and the hardness standard deviation ratio between the surface layer portion and the thickness middle portion can be made less than 1.0.

Specifically, the hardness standard deviation ratio can be controlled by adjusting a highest heating temperature and a holding time in decarburization annealing of the steel sheet for hot stamping, which is a known technology. As for preferable conditions of the decarburization annealing, the decarburization annealing temperature (maximum attainment temperature of the steel sheet) is 700° C. to 950° C., and the residence time in a temperature range of 700° C. to 950° C. is 5 seconds to 1,200 seconds under a moist atmosphere containing hydrogen, nitrogen, or oxygen.

In addition, in a case where the annealing temperature is set to a higher temperature range and the residence temperature is narrowed to a longer time range within the above condition ranges, the hardness standard deviation ratio can be made less than 0.8.

At least one surface layer portion of the wall portion 123 may satisfy the above hardness standard deviation ratio condition. However, it is preferable that the surface layer portions on both sides of the wall portion 123 satisfy the above hardness standard deviation ratio condition.

According to the frame member 1 of the present embodiment, elastic buckling is suppressed by controlling the width $H_0$ of the wall portion 123 of the recessed bead part 100, and fracture during deformation can be suppressed by controlling the hardness standard deviation ratio.

Accordingly, the energy absorption efficiency can be significantly improved while the thickness middle portion of the wall portion 123 of the recessed bead part 100 has sufficient hardness of 520 Hv or greater in terms of Vickers hardness.

Second Embodiment

Hereinafter, a frame member 2 according to a second embodiment of the present invention will be described.

The frame member 2 according to the second embodiment is different from the frame member 1 according to the first embodiment in that a cross section perpendicular to a longitudinal direction is formed as a closed cross section by two members. That is, in the frame member 2, a closed cross section portion is configured by two members joined to each other.

Duplicating description will be omitted as for constituent elements having substantially the same functional configuration as the functional configuration described in the first embodiment.

Figure 5:
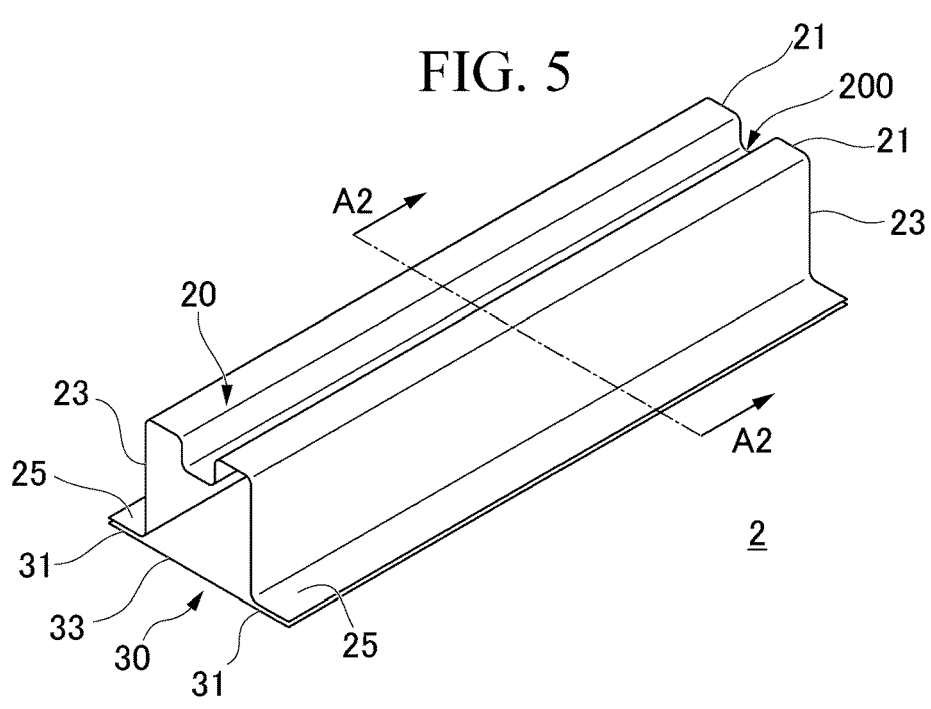
FIG. 5 is a perspective view showing a frame member according to a modification example.
Figure 6:
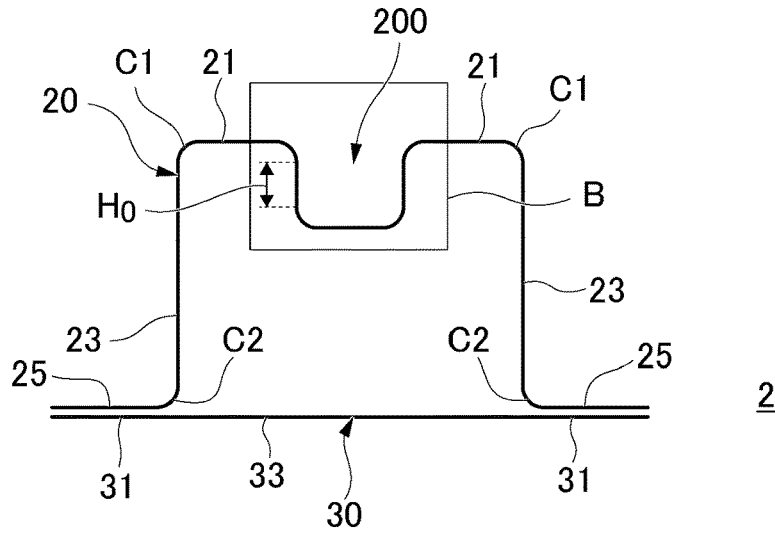
FIG. 6 is a cross-sectional view along the cutting-plane line A2-A2 of FIG. 5.
Figure 7:
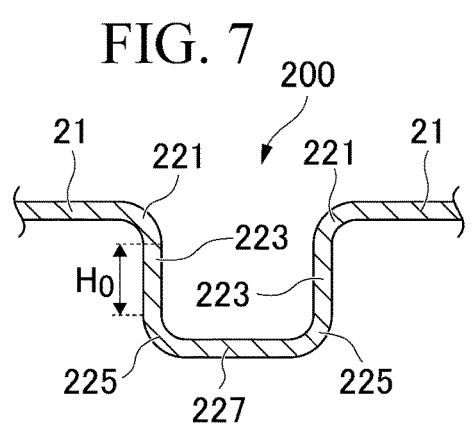
FIG. 7 is an enlarged view of a region surrounded by B of FIG. 6.

FIG. 5 is a perspective view of the frame member 2. FIG. 6 is a cross-sectional view along the cutting-plane line A2-A2 of FIG. 5, and is a cross-sectional view perpendicular to the longitudinal direction of the frame member 2. FIG. 7 is an enlarged view of a region surrounded by B of FIG. 6.

As shown in FIGS. 5 and 6, the frame member 2 has a closed cross section portion formed by joining a first frame member 20 to a second frame member 30. That is, the closed cross section portion is configured to include the first frame member 20 and the second frame member 30.

The first frame member 20 is a member having a hat-shaped cross section, and its top sheet surface functions as a bending compressive assuming surface.

In the bending compressive assuming surface, a recessed bead part 200 is interposed between two first flat parts 21, 21.

First corner parts C1, C1 are formed at outer end portions of the first flat parts 21, 21. Two second flat parts 23, 23 whose surfaces face each other extend from end portions of the first corner parts C1, C1 on the sides opposite to the first flat parts 21, 21.

Furthermore, second corner parts C2, C2 bent in directions away from each other are formed at end portions of the second flat parts 23, 23 on the sides opposite to the first corner parts C1, C1. Third flat parts 25, 25 extend in directions away from each other from end portions of the second corner parts C2, C2 on the sides opposite to the second flat parts 23.

The second frame member 30 is a flat plate-shaped steel sheet having: a pair of joint parts 31, 31 which are in surface contact with the third flat parts 25, 25 of the first frame member 20 and are joined by spot welding or the like; and a flat part 33 interposed between the pair of joint parts 31, 31.

Accordingly, in the frame member 2 according to the present embodiment, the recessed bead part 200, the first flat parts 21, 21, the second flat parts 23, 23, the first corner parts C1, C1, and the second corner parts C2, C2 in the first frame member 20, and the flat part 33 in the second frame member 30 form a closed cross section portion.

As shown in FIG. 7, in the cross section of the frame member 2 perpendicular to the longitudinal direction, the recessed bead part 200 includes first bent portions 221, 221, wall portions 223, 223, second bent portions 225, 225, and a bottom portion 227.

Since the configuration of the recessed bead part 200 is the same as that of the recessed bead part 100 described in the first embodiment, detailed description thereof will be omitted.

In the frame member 2 having a closed cross section portion configured by the two members joined to each other, elastic buckling is suppressed by controlling the width $H_0$ of the wall portion 223 of the recessed bead part 200, and fracture during deformation can be suppressed by controlling the hardness standard deviation ratio as in the frame member 1. The closed cross section portion may be formed of two or more members joined to each other.

Although the preferable embodiments of the present invention have been described in detail with reference to the accompanying drawings, the present invention is not limited to such examples.

It is apparent that a person having common knowledge in the technical field to which the present invention belongs is able to devise various changes or modifications within the scope of the technical idea described in the claims, and it should be understood that such examples belong to the technical scope of the present invention as a matter of course.

For example, the frame member 1 according to the first embodiment has a configuration in which one recessed bead part is provided on the bending compressive assuming surface, but two or more recessed bead parts may be formed on the bending compressive assuming surface. That is, two recessed bead parts 100A, 100A may be formed on the bending compressive assuming surface as in a frame member 1A according to a first modification example shown in FIG. 8. In this case, it is possible to exhibit more excellent energy absorption efficiency by satisfying a condition in which a width $H_0$ of a wall portion 123A of the two recessed bead parts 100A, 100A is 0.5 times or greater and 2.5 times or less an effective width $W_e$ calculated from Karman's effective width formula.

In addition, the number of flat parts is not particularly limited, and there may be at least two flat parts connected to a bent portion of the recessed bead part.

In addition, for example, the above-described recessed bead part 100 has the pair of wall portions 123, 123 extending and facing each other, but may have a pair of wall portions 123B, 123B extending and inclining relative to each other as in a recessed bead part 100B according to a second modification example shown in FIG. 9.

More specifically, the recessed bead 100B according to this modification example includes first bent portions 121B, 121B bent toward the inside of a closed cross section, the wall portions 123B, 123B protruding and inclining relative to each other toward the inside of a closed cross section portion via the first bent portions 121B, 121B, second bent portions 125B, 125B bent in directions facing each other from end portions of the wall portions 123B, 123B on the sides opposite to the first bent portions 121B, 121B, and a bottom portion 127B linearly connecting end portions of the second bent portions 125B, 125B on the sides opposite to the wall portions 123B, 123B to each other.

In addition, for example, the above-described recessed bead part 100 has the pair of second bent portions 125, 125 and the bottom portion 127, but may have an aspect in which a pair of wall portions 123C, 123C extending and inclining relative to each other are connected to each other by a single second bent portion 125C as in a recessed bead part 100C according to a third modification example shown in FIG. 10.

More specifically, the recessed bead 100C according to this modification example includes first bent portions 121C, 121C bent toward the inside of a closed cross section, wall portions 123C, 123C protruding and inclining relative to each other toward the inside of a closed cross section portion via the first bent portions 121C, 121C, and the second bent portion 125C connecting end portions of the wall portions 123C, 123C on the sides opposite to the first bent portions 121C, 121C to each other. That is, the recessed bead 100C is not configured to include the linear bottom portion 27 shown in the first embodiment.

In addition, the frame members 1, 2 according to the embodiments have a uniform cross-sectional shape over the whole length, but may not have a uniform cross-sectional shape over the whole length, and the above-described closed cross section portion may be present in a part of the whole length in the longitudinal direction. The closed cross section portion is present in preferably 50% or greater, and more preferably 80% or greater of the whole length in the longitudinal direction.

Figure 11:
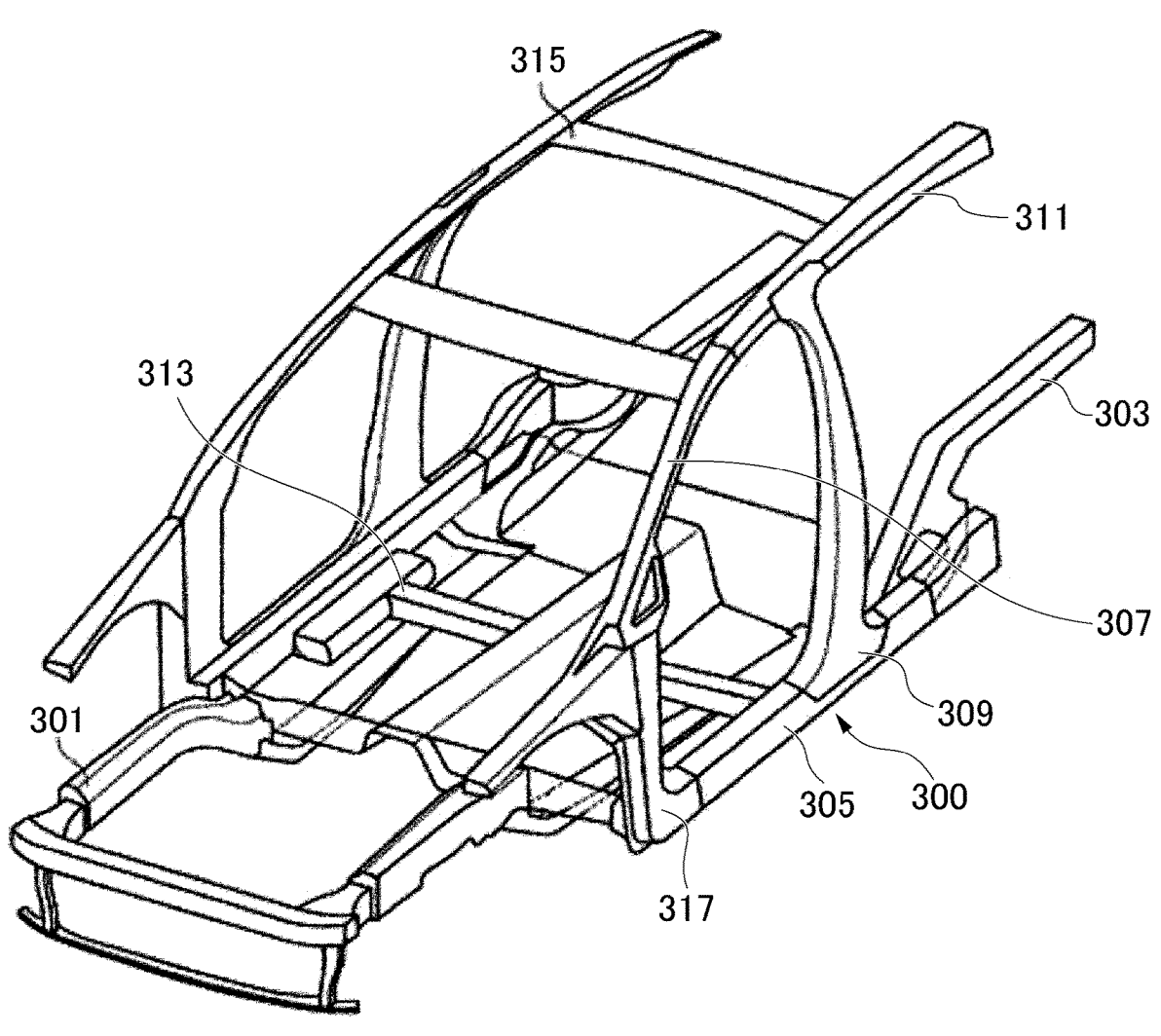
FIG. 11 is a perspective view showing a vehicle frame as an example to which the frame member is applied.

The frame members 1, 2 are applied to members to which a compression input is to be applied mainly in the axial direction at the time of the collision, among structural members of a vehicle body. FIG. 11 is a view showing a vehicle frame 300 as an example to which the frame members 1, 2 are applied.

Referring to FIG. 11, the frame members 1, 2 can be applied to a frontside member 301, a rearside member 303, a side sill 305, an A pillar 307, a B pillar 309, a roof rail 311, a floor cross 313, a roof cross 315, and an under reinforcement 317 among structural members of a vehicle body.

Hereinafter, the effects of the present invention will be described in greater detail based on examples. However, the conditions in the examples are merely an example adopted to confirm the feasibility and the effects of the present invention. The present invention is not limited to these examples of the conditions. In the present invention, various conditions can be adopted as long as the gist of the present invention is not deviated and the object of the present invention is achieved.

First Example

A steel sheet A and a steel sheet B having a sheet thickness of 0.5 mm were prepared.

Both the steel sheet A and the steel sheet B are steel sheets for hot stamping to be subjected to hot stamping.

In decarburization annealing of the steel sheet B, the decarburization annealing temperature (maximum attainment temperature of the steel sheet) was set to 750° C., and the residence time in a temperature range of 700° C. to 750° C. was set to 300 seconds under a moist atmosphere provided by mixing hydrogen and nitrogen, to modify the metallographic structure in only a surface layer portion and the vicinity thereof.

These steel sheets A and B were heated up to an austenite range, held in a temperature range of 900° C. to 950° C., and hot-stamped by a press die and punch having a rapid cooling mechanism. Then, end surfaces of the hot-stamped member were welded to each other, whereby a rectangular tube member having a length of 296 mm was obtained.

Figure 12:
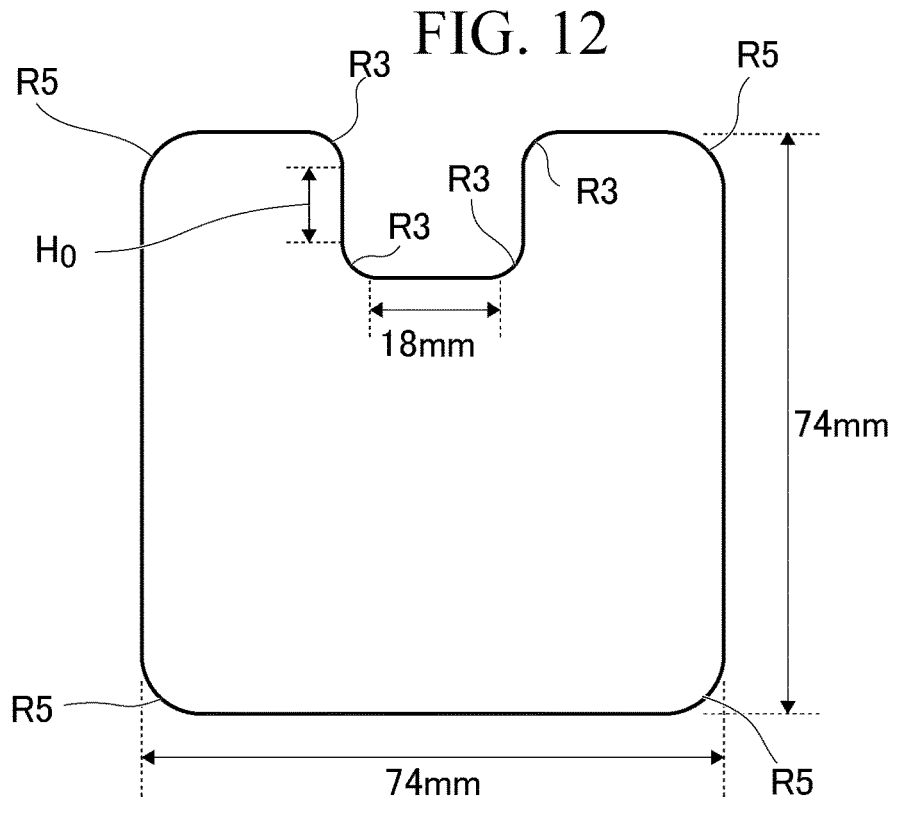
FIG. 12 is a schematic view for explaining a cross-sectional shape of a rectangular tube member used in First Example.

FIG. 12 is a schematic view for explaining a cross-sectional shape of a rectangular tube member in examples. As shown in FIG. 12, a substantially square cross section where the length of one side was 74 mm was designed as a basic design in all experimental examples.

In Experimental Example 1A and Experimental Example 1B, a rectangular tube member having the above basic design was adopted.

In Experimental Examples 2A to 7B, by changing the shape of the press die and punch used in the hot stamp forming, a recessed bead part having a predetermined width $H_0$ was provided on one side of the rectangular tube member having the basic design.

The radii of curvature of four corner parts C were all designed to be 5 mm, and the radii of curvature of bent portions in the recessed bead part were all set to 3 mm.

Table 1 shows material characteristics in the flat parts of the rectangular tube members after hot stamping.

TABLE 1

| Steel Sheet Used | Tensile Strength | Yield stress $\sigma_y$ (MPa) | Young's modulus E (MPa) | Poisson's ratio $\nu$ | Sheet Thickness (mm) | Hardness in Center in Sheet Thickness (Hv) | Hardness Standard Deviation in Thickness Middle Portion | Hardness Standard Deviation in Surface Layer Portion | Hardness Standard Deviation Ratio | Effective Width $W_e$ (mm) |
|---|---|---|---|---|---|---|---|---|---|---|
| Steel Sheet A (Material of Related Art) | 2500 MPa | 1873 | 205800 | 0.3 | 0.5 | 851 | 8.2 | 8.2 | 1.0 | 40 |
| Steel Sheet B (Modified Material) | 2500 MPa | 1873 | 205800 | 0.3 | 0.5 | 851 | 8.2 | 5.3 | 0.65 | 40 |

In the rectangular tube member in which the steel sheet A was used, the metallographic structure was the same in a thickness middle portion and a surface layer portion, and thus the hardness standard deviation ratio in the flat part was 1.0. That is, in Experimental Examples 2A, 3A, 4A, 5A, 6A, and 7A in which the recessed bead part was provided, the hardness standard deviation ratio in the wall portion of the recessed bead part was 1.0.

Meanwhile, in the rectangular tube member in which the steel sheet B was used, the hardness standard deviation ratio in the flat part was 0.65 since the metallographic structure of a thickness middle portion was not modified, but the metallographic structure of a surface layer portion was modified. That is, in Experimental Examples 2B, 3B, 4B, 5B, 6B, and 7B in which the recessed bead part was provided, the hardness standard deviation ratio in the wall portion of the recessed bead part was 0.65.

A rigid flat impactor was allowed to collide with the bending compressive assuming surface of each of the rectangular tube members at a speed of 80 km/h in a state in which both ends in the longitudinal direction were completely restricted. The deformation states at the time of the collision, the states in which fracture occurred, and the absorbed energy calculated from the impactor reaction force (load) and the stroke were compared.

Table 2 shows the setting conditions and the results for each experimental example.

TABLE 2

| Experiment No. | Steel Sheet Used | Width $H_0$ of Wall Portion (mm) | Effective Width Ratio | Cross Section Area (mm²) | State of Fracture | Absorbed Energy (J) | Energy Absorption Efficiency (J/mm²) | Remarks |
|---|---|---|---|---|---|---|---|---|
| No. 1A | A | — | — | 144 | Crack Penetration | 120 | 0.84 | Comparative Example |
| No. 1B | B | — | — | 144 | No Cracks | 166 | 1.16 | Comparative Example |
| No. 2A | A | 0 | 0 | 147 | Crack Penetration | 162 | 1.10 | Comparative Example |
| No. 2B | B | 0 | 0 | 147 | No Cracks | 189 | 1.28 | Comparative Example |
| No. 3A | A | 5 | 0.5 | 152 | Crack Penetration | 202 | 1.33 | Comparative Example |
| No. 3B | B | 5 | 0.5 | 152 | No Cracks | 258 | 1.70 | Invention Example |
| No. 4A | A | 7 | 0.7 | 155 | Crack Penetration | 190 | 1.23 | Comparative Example |
| No. 4B | B | 7 | 0.7 | 155 | No Cracks | 281 | 1.81 | Invention Example |
| No. 5A | A | 10 | 1.1 | 157 | Crack Penetration | 221 | 1.40 | Comparative Example |
| No. 5B | B | 10 | 1.1 | 157 | No Cracks | 273 | 1.74 | Invention Example |
| No. 6A | A | 20 | 2.1 | 167 | Crack Penetration | 221 | 1.32 | Comparative Example |
| No. 6B | B | 20 | 2.1 | 167 | No Cracks | 319 | 1.91 | Invention Example |
| No. 7A | A | 30 | 3.2 | 177 | Crack Penetration | 203 | 1.14 | Comparative Example |
| No. 7B | B | 30 | 3.2 | 177 | No Cracks | 278 | 1.51 | Comparative Example |

In Experimental Examples 1A, 2A, 3A, 4A, 5A, 6A, and 7A, since the hardness standard deviation ratio was 1.0, it was not possible to obtain good bendability, and crack penetration occurred during deformation. As a result, the energy absorption efficiency was inferior.

Experimental Example 1B is a comparative example in which the hardness standard deviation ratio is appropriately controlled, but the recessed bead part is not formed. In this comparative example, the proof stress improvement effect due to the recessed bead part provided was not obtained, and the energy absorption efficiency was inferior.

A rigid flat impactor was allowed to collide with the bending compressive assuming surface of each of the rectangular tube members at a speed of 80 km/h in a state in which both ends in the longitudinal direction were completely restricted. The deformation states at the time of the collision, the states in which fracture occurred, and the absorbed energy calculated from the impactor reaction force (load) and the stroke were compared.

Table 3 shows the setting conditions and the results for each experimental example.

TABLE 3

| Experiment No. | Steel Sheet Used | Width $H_0$ of Wall Portion (mm) | Effective Width Ratio | Cross Section Area $(mm^2)$ | State of Fracture | Absorbed Energy (J) | Energy Absorption Efficiency $(J/mm^2)$ | Remarks |
|---|---|---|---|---|---|---|---|---|
| No. 8A | A | 0 | 0 | 150 | Crack Penetration | 220 | 1.47 | Comparative Example |
| No. 8B | B | 0 | 0 | 150 | No Cracks | 272 | 1.81 | Comparative Example |
| No. 9A | A | 7 | 0.7 | 175 | Crack Penetration | 404 | 2.31 | Comparative Example |
| No. 9B | B | 7 | 0.7 | 175 | No Cracks | 500 | 2.86 | Invention Example |

In addition, Experimental Example 2B is a comparative example in which although the hardness standard deviation ratio is appropriately controlled and the recessed bead part is formed, the effective width ratio is low. In this comparative example, since early buckling occurred due to the low effective width ratio, the absorbed energy was low, and the energy absorption efficiency was inferior.

Meanwhile, in Experimental Examples 3B, 4B, 5B, 6B, and 7B, the hardness standard deviation ratio was appropriately controlled, and the effective width ratio was also appropriate. Therefore, even though a 1,800 MPa-grade hot stamping member was used, fracture and elastic buckling did not occur, and excellent energy absorption efficiency could be exhibited.

Figure 13:
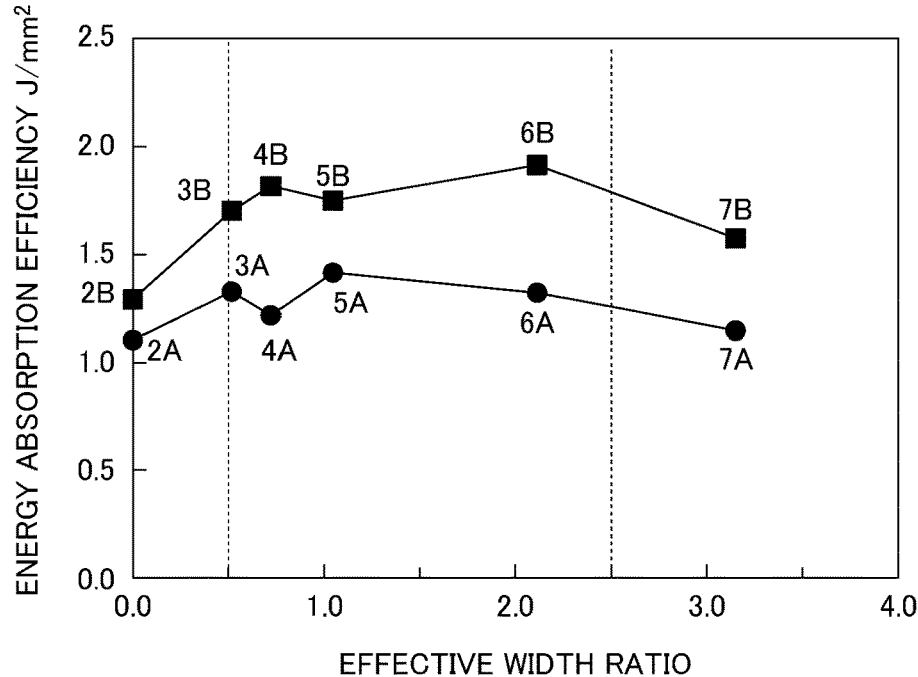
FIG. 13 is a graph in which a relationship between an effective width ratio and energy absorption efficiency in First Example is plotted.

FIG. 13 is a graph for comparison of the energy absorption efficiency relative to the effective width ratio based on the experimental results shown in Table 2. As shown in this graph, it is found that in a case where a bead shape in which the effective width ratio is in an appropriate range is formed and the hardness standard deviation ratio is appropriately controlled, the energy absorption efficiency is significantly improved.

Second Example

Furthermore, as Second Example, experiments for verifying that excellent energy absorption efficiency could be exhibited by providing a plurality of recessed bead parts were performed by using the same steel sheet A and steel sheet B as those in First Example.

Figure 14:
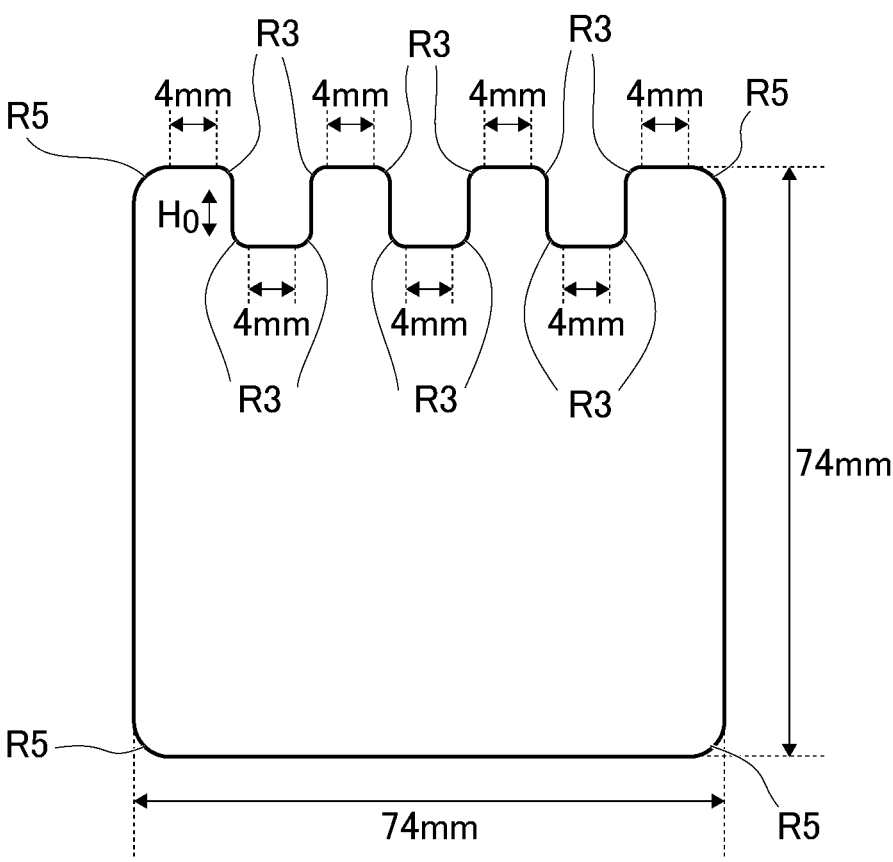
FIG. 14 is a schematic view for explaining a cross-sectional shape of a rectangular tube member used in Second Example.

In Experimental Examples 8A, 8B, 9A, and 9B, as shown in FIG. 14, a substantially square cross section of the rectangular tube member perpendicular to the longitudinal direction, where the length of one side was 74 mm and three recessed bead parts with a width $H_0$ were provided on one side, was designed as a basic design, and the width $H_0$ of the wall portion was changed for each experimental example.

The radii of curvature of four corner parts C were all designed to be 5 mm, and the radii of curvature of the recessed bead parts were all set to 3 mm.

In Experimental Examples 8A and 9A, since the hardness standard deviation ratio was 1.0, it was not possible to obtain good bendability, and crack penetration occurred during deformation. As a result, the energy absorption efficiency was inferior.

In addition, Experimental Example 8B is a comparative example in which although the hardness standard deviation ratio is appropriately controlled, the effective width ratio is 0. In this comparative example, the absorbed energy was low due to early buckling, and the energy absorption efficiency was inferior.

Meanwhile, in Experimental Example 9B, the hardness standard deviation ratio was appropriately controlled, and the effective width ratio was also appropriate. Therefore, even though a 1,800 MPa-grade hot stamping member was used, fracture and elastic buckling did not occur, and excellent energy absorption efficiency could be exhibited.

In particular, compared to in Experimental Example 4B of Table 2 in which one recessed bead part is formed, the energy absorption efficiency increases 1.74 times in Experimental Example 9B of Table 3 in which three recessed bead parts are provided. That is, it can be said that excellent energy absorption efficiency can be exhibited by providing a plurality of recessed bead parts.

INDUSTRIAL APPLICABILITY

According to the present invention, it is possible to provide a frame member having excellent energy absorption efficiency.

BRIEF DESCRIPTION OF THE REFERENCE SYMBOLS 1, 2 frame member
20 first frame member
30 Second frame member
100, 100A, 100B, 200 recessed bead part
123, 123A, 123B, 223 wall portion

What is claimed is:

1. A frame member formed by hot-stamping a steel sheet, wherein the frame member has a closed cross section portion in which a cross section perpendicular to a longitudinal direction is a closed cross section,
the closed cross section portion has
   at least two flat parts having a radius of curvature larger than a maximum external dimension of the cross section, and
   a recessed bead part formed between the two flat parts,
the recessed bead part has a pair of wall portions which have a radius of curvature of 50 mm or greater, and protrude toward an inside of the closed cross section portion from end portions of the two flat parts facing each other via a pair of bent portions bent toward an inside of the closed cross section,
a Vickers hardness of a thickness middle portion in each wall portion of the pair of wall portions is 520 Hv or greater,
a width of each wall portion of the pair of wall portions is 0.5 times or greater and 2.5 times or less an effective width $W_e$ obtained from Karman's effective width formula, and
for each wall portion of the pair of wall portions, a standard deviation ratio obtained by dividing a standard deviation of hardness frequency distribution in a surface layer portion in the wall portion by a standard deviation of hardness frequency distribution in the thickness middle portion in the wall portion is less than 1.0.

2. The frame member according to claim 1, wherein the closed cross section portion is configured by joining a plurality of members together.

3. The frame member according to claim 1, wherein a sheet thickness of the recessed bead part is 1.2 mm or less.

4. The frame member according to claim 1, further comprising:
   two or more recessed bead parts, including the recessed beat part.

5. The frame member according to claim 1, wherein the standard deviation ratio is less than 0.8.

6. The frame member according to claim 1, wherein the closed cross section portion is present in 50% or greater of a whole length of the frame member in the longitudinal direction.

7. The frame member according to claim 6, wherein the closed cross section portion is configured by joining a plurality of members together.

8. The frame member according to claim 6, wherein a sheet thickness of the recessed bead part is 1.2 mm or less.

9. The frame member according to claim 6, further comprising:
   two or more recessed bead parts, including the recessed bead part.

10. The frame member according to claim 6, wherein the standard deviation ratio is less than 0.8.

* * * * *